United States Patent
Lee et al.

(10) Patent No.: US 12,113,447 B2
(45) Date of Patent: Oct. 8, 2024

(54) APPARATUS AND METHOD FOR CONTROLLING CONVERTER

(71) Applicants: Hyundai Motor Company, Seoul (KR); Kia Corporation, Seoul (KR)

(72) Inventors: Dae Woo Lee, Incheon (KR); Tae Jong Ha, Songpa-gu (KR); Byung Gu Kang, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 206 days.

(21) Appl. No.: 17/861,475

(22) Filed: Jul. 11, 2022

(65) Prior Publication Data
US 2023/0076042 A1 Mar. 9, 2023

(30) Foreign Application Priority Data
Sep. 6, 2021 (KR) .................. 10-2021-0118389

(51) Int. Cl.
*H02M 3/335* (2006.01)
*H02M 1/00* (2006.01)
*H02M 3/00* (2006.01)

(52) U.S. Cl.
CPC ..... *H02M 3/33573* (2021.05); *H02M 1/0009* (2021.05); *H02M 3/01* (2021.05); *H02M 3/33571* (2021.05)

(58) Field of Classification Search
CPC ............ H02M 3/22; H02M 1/08; H02M 1/36; H02M 3/24; H02M 3/325; H02M 3/335; H02M 3/28; H02M 3/01; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/33561; H02M 3/155; H02M 3/1582; H02M 1/4233; H02M 1/12; H02M 3/07; H02M 7/219; H02M 7/4815; H02M 1/0048; H02M 7/4818; H02M 7/4826; Y02B 70/1491
See application file for complete search history.

(56) References Cited

U.S. PATENT DOCUMENTS 8,693,213 B2 * 4/2014 Jungreis .............. H02M 1/4241
363/17
10,050,546 B1 8/2018 Choi et al.
11,909,323 B2 * 2/2024 Wang ...................... H02M 3/01
(Continued)

FOREIGN PATENT DOCUMENTS

KR 102008420 B1 8/2019

*Primary Examiner* — Jeffrey A Gblende
(74) *Attorney, Agent, or Firm* — Slater Matsil, LLP

(57) ABSTRACT

An embodiment apparatus includes a converter including a plurality of switching elements configured as a bridge circuit connected to an input terminal and having a plurality of bridge arms, wherein a topology of the converter is configured to be switchable to a full-bridge type topology or a half-bridge type topology, and wherein a resonant capacitor is connected to a midpoint between respective ones of the bridge arms, and a controller configured to switch the topology of the converter to the full-bridge type or the half-bridge type by controlling whether the resonant capacitor is activated based on a load current of the converter.

20 Claims, 7 Drawing Sheets

(56) References Cited

U.S. PATENT DOCUMENTS

| | | | | |
|---|---|---|---|---|
| 2012/0092899 A1* | 4/2012 | Moussaoui | ....... | H02M 3/33573 363/17 |
| 2013/0336013 A1* | 12/2013 | Mueller | ............ | H02M 3/33573 363/17 |
| 2014/0268962 A1* | 9/2014 | Lee | ....................... | H02M 7/487 363/123 |
| 2023/0049426 A1* | 2/2023 | Acevedo Simon | .... | H05B 6/062 |

* cited by examiner

APPARATUS AND METHOD FOR CONTROLLING CONVERTER

CROSS-REFERENCE TO RELATED APPLICATIONS

This application claims the benefit of Korean Patent Application No. 10-2021-0118389, filed Sep. 6, 2021, which application is hereby incorporated herein by reference.

TECHNICAL FIELD

The present invention relates to an apparatus and method for controlling a converter.

BACKGROUND

The characteristics of an LLC resonant converter are determined by the resonant frequency, which is determined by two inductors and one capacitor which forms a resonant tank that is adjacent to a transformer. Since the LLC resonant converter uses a resonant current generated by two inductors and one capacitor, it has the advantage of greatly reducing diode switching loss. As such an LLC resonant converter, a full-bridge (FB) type LLC converter structure is widely used.

On the other hand, a conventional FB type LLC converter has good efficiency because a zero voltage switching (ZVS) is possible when the load is small, but has decreased efficiency because a current ripple increases when the load is large. In addition, there is a problem in that the FB type LLC converter cannot operate at the optimized switching frequency due to constraints such as the minimum/maximum voltage of a link capacitor, the voltage range and charging current of a high-current battery, and the maximum switching frequency of the converter due to microcontroller unit (MCU) memory limitations.

The matters described in the background section are only for improving understanding of the background of the present invention, and should not be taken as acknowledging that they correspond to the prior art already known to those of ordinary skill in the art.

SUMMARY

The present invention relates to an apparatus and method for controlling a converter. Particular embodiments relate to an apparatus and method for controlling a converter that detects a load current of a converter and controls whether a resonant capacitor is activated or not based on the detected current, and switches a topology to a half-bridge (HB) type LLC converter at a small load and to a phase shift full-bridge (PSFB) type converter at a high load, so that power conversion efficiency is increased.

Therefore, embodiments of the present invention keep in mind problems in the prior art, and an embodiment of the present invention provides an apparatus and method for controlling a convertor that detects a load current of a converter and controls whether or not a resonant capacitor is activated based on the detected current, and switches a topology of the converter to a half-bridge (HB) type LLC converter at a small load and to a phase shift full-bridge (PSFB) type converter at a large load, so that power conversion efficiency is increased.

Embodiments of the present invention are not limited to addressing the technical problems as described above, and another technical problem may be derived from the following description.

According to one embodiment of the present invention, there is provided an apparatus for controlling a converter comprising a converter including a plurality of switching elements that configures a bridge circuit connected to an input terminal and having a plurality of bridge arms, that may be converted to a full-bridge type topology or a half-bridge type topology, and that is connected to a resonant capacitor that is connected to a midpoint connected between the respective bridge arms, and a controller that converts the topology of the converter to a full-bridge type or a half-bridge type by controlling whether the resonant capacitor is activated based on a load current of the converter.

The controller may change the topology of the converter by controlling to turn on-off the plurality of switching elements based on a load current value of the converter.

The controller may switch the topology of the converter by controlling to turn on-off the plurality of switching elements based on the load current value of the converter detected by a current sensor provided on the load of the converter.

The controller may control to activate the resonant capacitor when the load current value of the converter detected by the current sensor provided on the load of the converter is within a predetermined low current region.

The controller may control to inactivate the resonant capacitor when the load current value of the converter detected by the current sensor provided on the load of the converter is within a predetermined high current region.

The plurality of switching elements may include a first switch and a third switch connected in series to a first bridge arm of the input terminal and a second switch and a fourth switch connected in series to a second bridge arm of the input terminal. The converter may include the resonant capacitor having one end connected to the first bridge arm between the first switch and the third switch, and the other end connected to the second bridge arm between the second switch and the fourth switch, and the resonant capacitor may further include a control switch connected in parallel to the resonant capacitor.

The controller may control whether the resonant capacitor is activated by controlling an operation of the control switch based on the load current of the converter.

The control switch may have one end connected to the second bridge arm between the second switch and the fourth switch, and the other end connected to the first bridge arm between the first switch and the third switch, and may turn on or off whether the resonant capacitor is activated according to the control of the controller.

The controller may control to deactivate the resonant capacitor when the control switch is controlled to be turned on, and may control to activate the resonant capacitor when the control switch is controlled to be turned off.

A method for controlling a converter according to another embodiment includes the steps of detecting a load current of a converter including a bridge circuit and switching a topology of the converter by controlling whether a resonant capacitor connected between first and second bridge arms constituting the bridge circuit is activated based on the detected load current of the converter.

The topology of the converter may have a full-bridge type or a half-bridge type.

The step of switching the topology of the converter may be performed by controlling to turn on-off a plurality of switches disposed at an input terminal of the converter.

In the step of converting the topology of the converter, the topology of the converter may be switched to the half-bridge type when a detected load side current value of the converter is within a predetermined low current region.

In the step of converting the topology of the converter, the topology of the converter may be switched to the full-bridge type when a detected load side current value of the converter is within a predetermined high current region.

In the step of switching the topology of the converter, an operation of a control switch connected in parallel to the resonant capacitor may be controlled based on the load current of the converter to control whether the resonant capacitor is activated.

By detecting a load current of a converter and controlling whether a resonant capacitor is activated or not based on the detected current, a topology is switched to a half-bridge (HB) type LLC converter at a low load and to a phase shift full-bridge (PSFB) type converter at a high load, so that there is a technical effect of increasing power conversion efficiency.

Embodiments of the present invention are not limited to the technical effects as described above, and another technical effect may be derived from the following description.

DETAILED DESCRIPTION OF ILLUSTRATIVE EMBODIMENTS

Specific structural or functional descriptions of the embodiments of the present invention disclosed in the present specification or application are only illustrated for the purpose of describing the embodiments according to the present invention, and the embodiments according to the present invention may be implemented in various forms and should not be construed as being limited to the embodiments described in the present specification or application. Hereinafter, embodiments of the present invention will be described in detail with reference to the accompanying drawings.

The present invention relates to an apparatus and method for controlling a converter that detects a load current of a converter and switches a topology to a half-bridge (HB) type LLC converter at a low load and to a phase shift full-bridge (PSFB) type converter at a high load based on the detected current, so power conversion efficiency is increased. Hereinafter, they may be briefly referred to as "converter control apparatus" and "converter control method", respectively.

Figure 1:
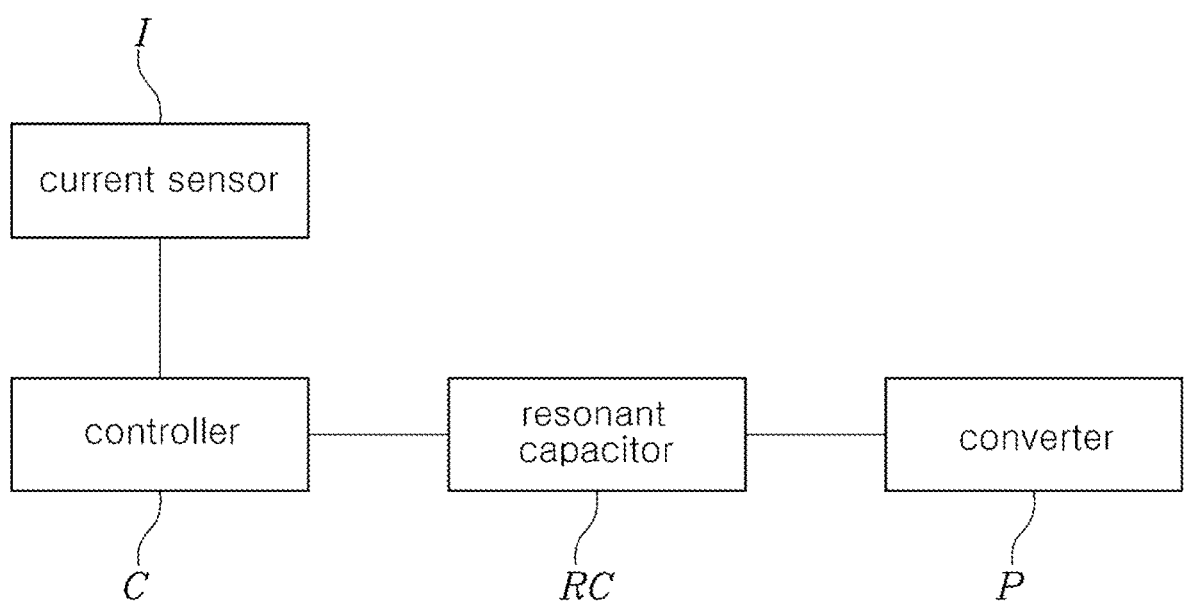
FIG. 1 is a block diagram of an apparatus for controlling a converter according to an embodiment of the present invention.
Figure 2A:
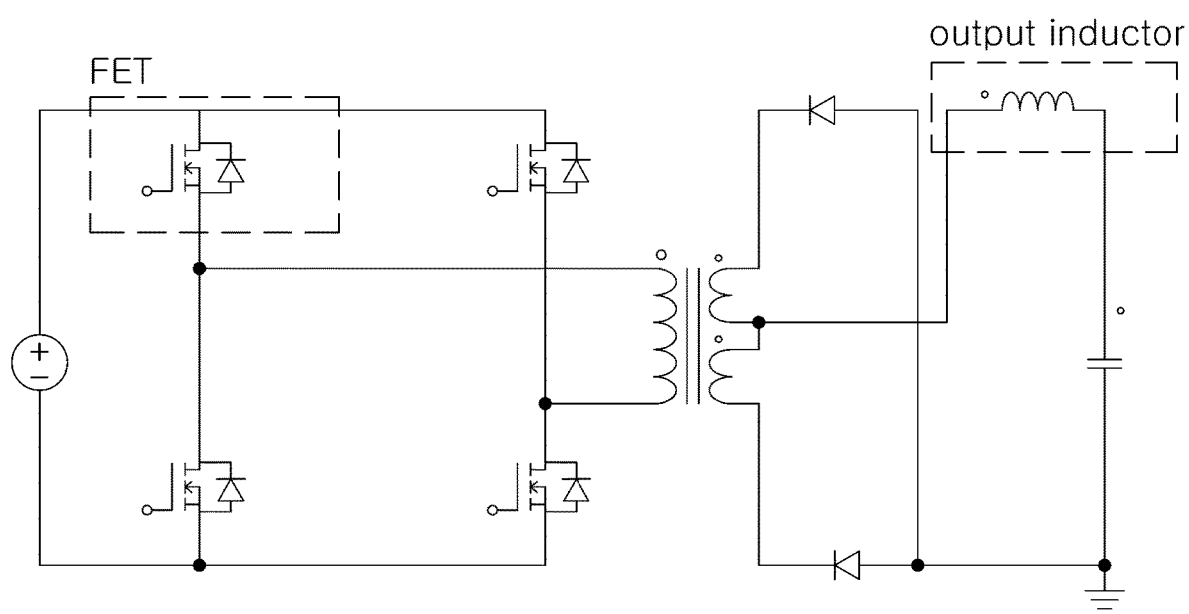
FIGS. 2A and 2b are views showing a PSFB converter and a half-bridge (HB) type LLC resonant converter according to the prior art.
Figure 2B:
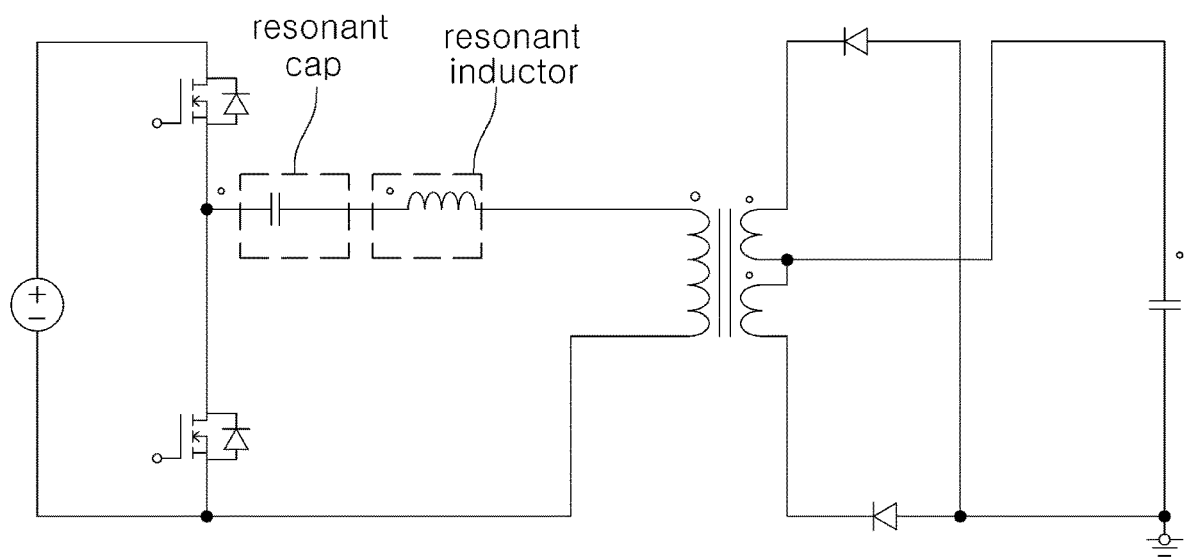
Figure 3:
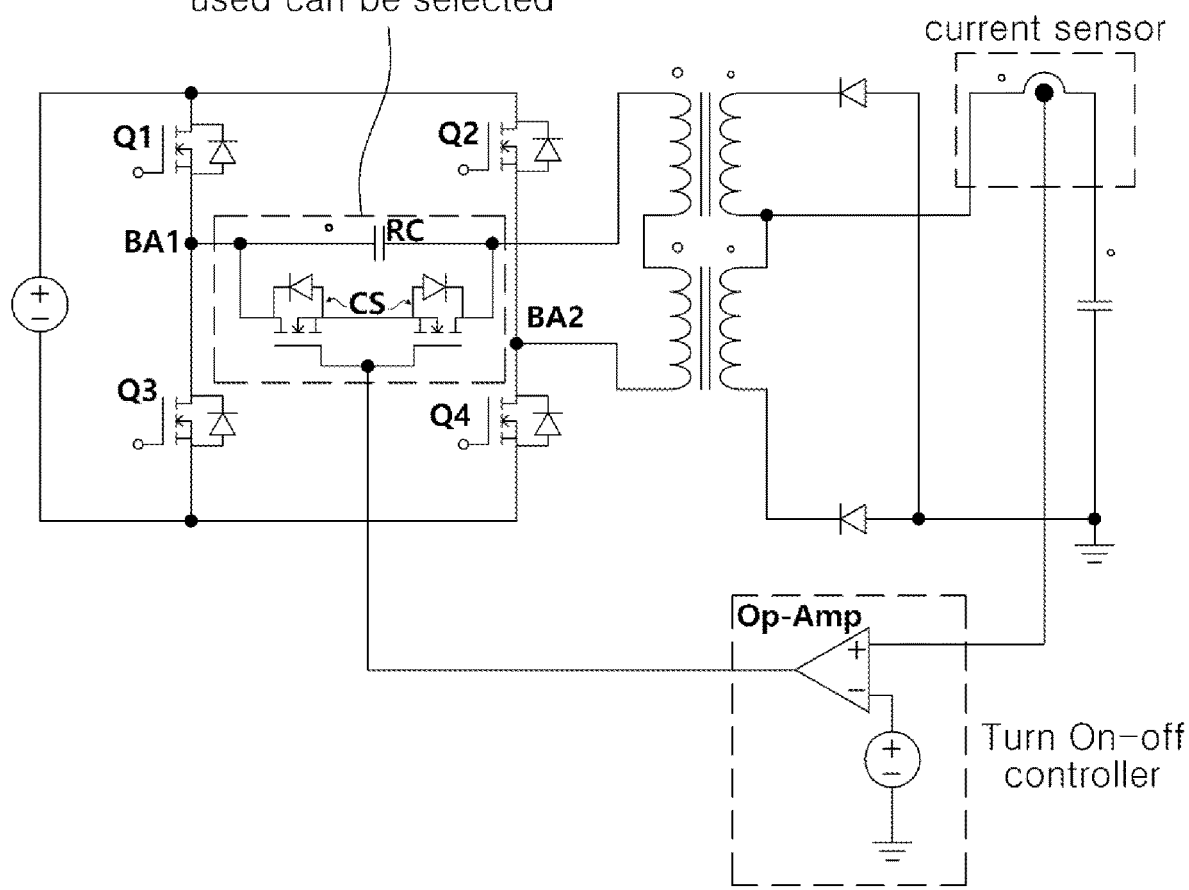
FIG. 3 is a view showing a converter according to an embodiment of the present invention.
Figure 4:
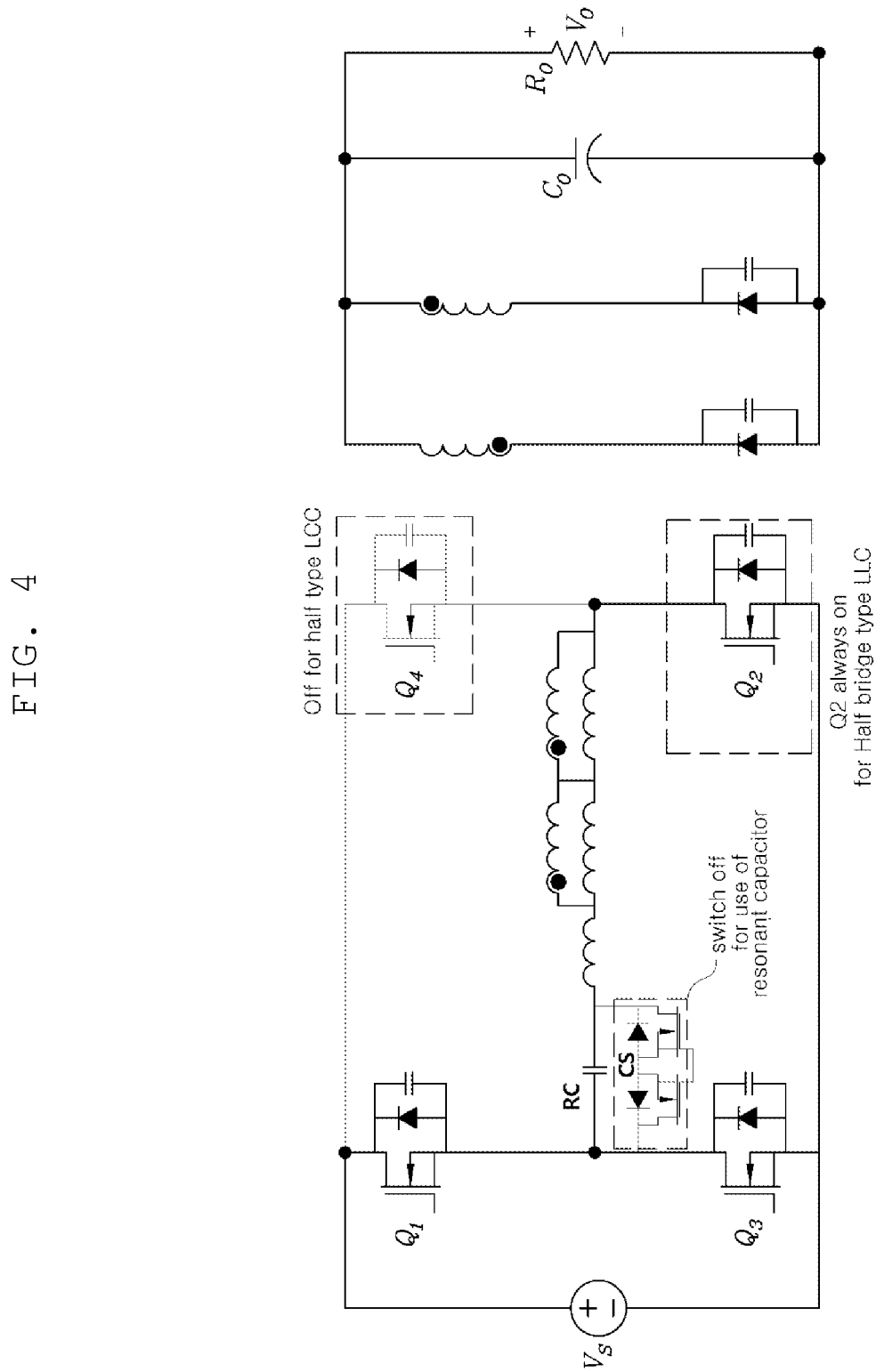
FIG. 4 and FIG. 5 are views showing an example of the operation of the converter shown in FIG. 3.
Figure 5:
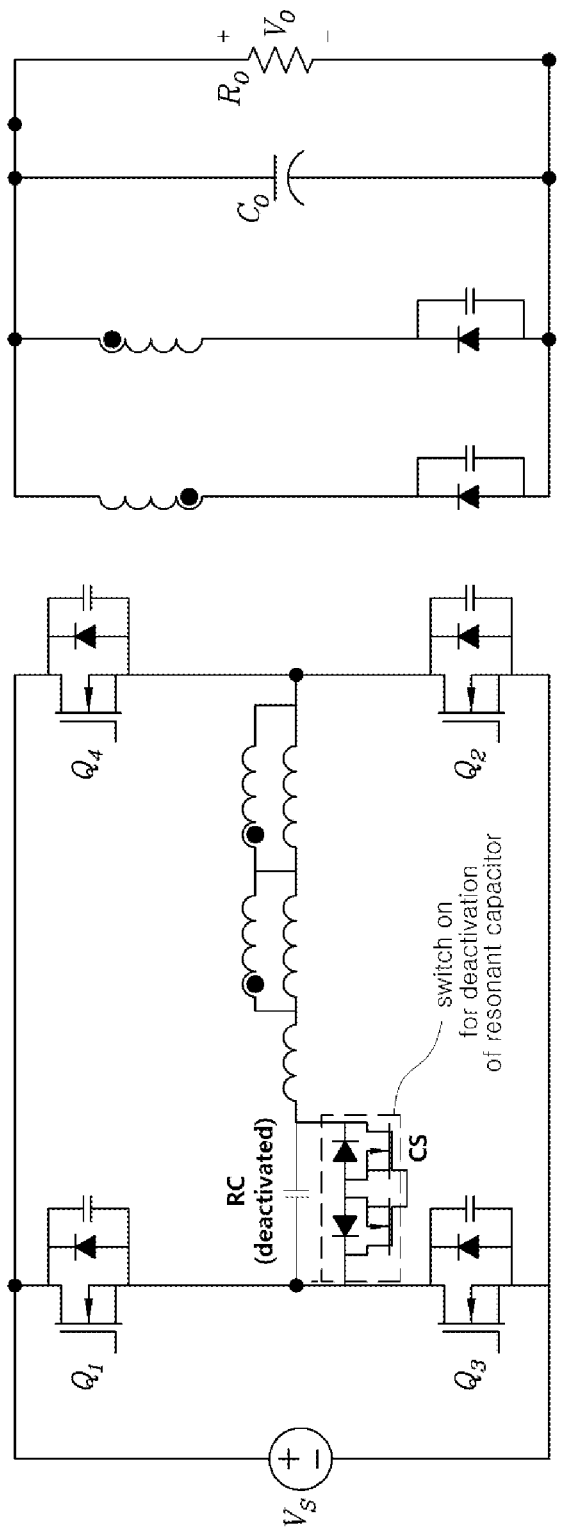
Figure 6:
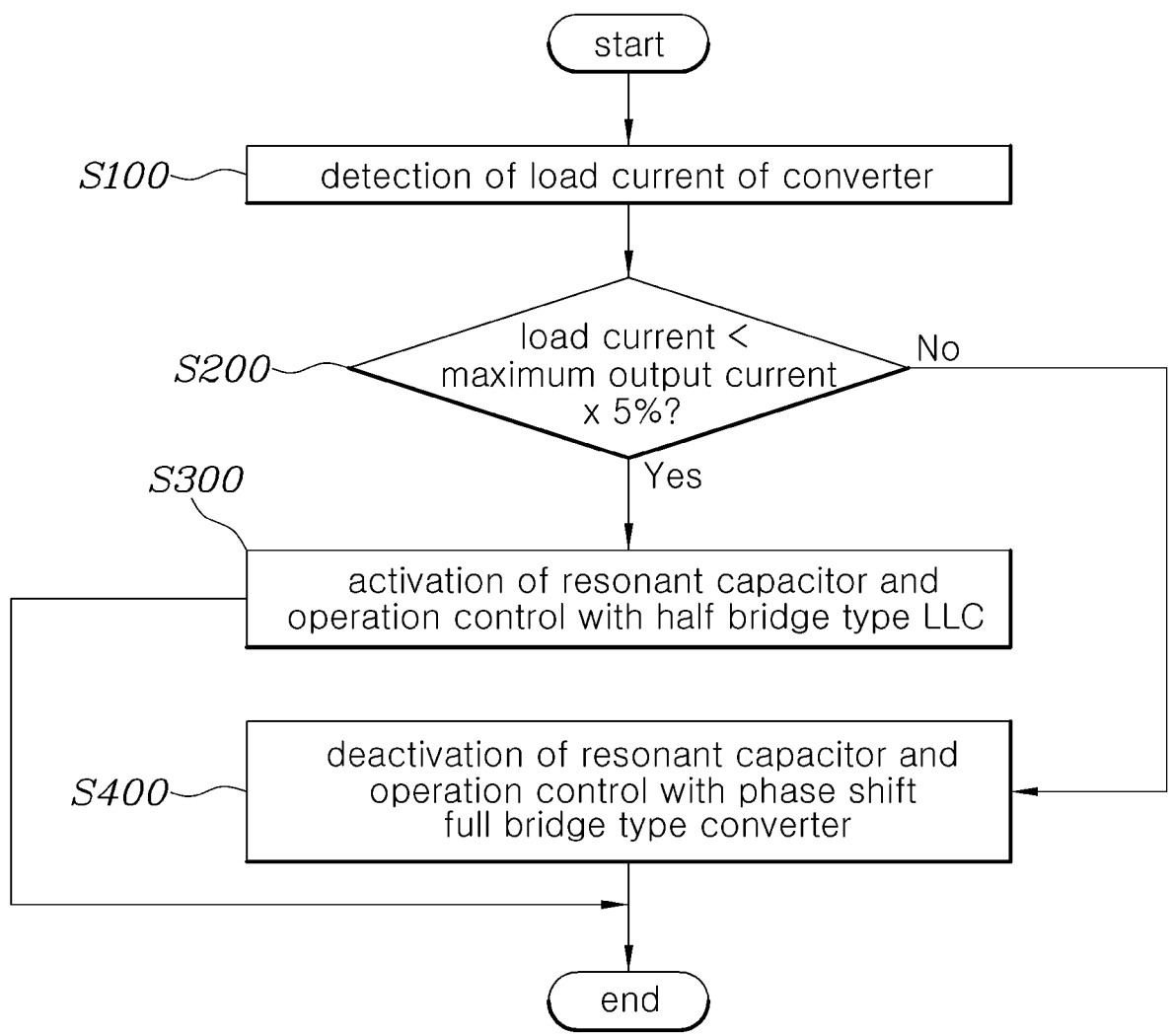
FIG. 6 is a flowchart of a method for controlling a converter according to another embodiment of the present invention.

FIG. 1 is a block diagram of an apparatus for controlling a converter according to an embodiment of the present invention, FIGS. 2A and 2B are views showing a PSFB converter and a half-bridge (HB) type LLC resonant converter according to a conventional art, FIG. 3 is a view showing a converter in which a resonant capacitor and a current sensor are added and an output inverter is removed according to an embodiment of the invention, FIGS. 4 and 5 are views showing an example of the operation of the converter shown in FIG. 3, and FIG. 6 is a flowchart of a method for controlling a converter according to another embodiment of the present invention.

FIG. 1 is a block diagram of an apparatus for controlling an LLC resonant converter according to an embodiment of the present invention, and the apparatus includes a converter P that includes a plurality of switching elements constituting a bridge circuit connected to an input terminal and having a plurality of bridge arms, is switchable to a full-bridge type topology or a half-bridge type topology, wherein a resonant capacitor RC is connected to a midpoint between the respective the bridge arms, and a controller C that switches the topology of the converter P to the full-bridge type or the half-bridge type by controlling whether or not the resonant capacitor RC is activated based on a load current of the converter P. In addition, in the apparatus for controlling an LLC resonant converter according to an embodiment of the present invention, the controller C controls to turn on-off the plurality of switching elements based on the load current value of the converter P, thereby switching the topology of the converter P. The controller C may switch the topology of the converter by controlling to turn on-off the plurality of switching elements based on the load current value of the converter detected by a current sensor I provided on the load of the converter P.

Referring to FIG. 1, an apparatus for controlling a converter according to an embodiment of the present invention is configured to include the converter P and the controller C. The converter P may be a DC-DC converter that converts the DC output of a power factor correction circuit (not shown), which compensates the power factor of an external AC power and outputs a DC power, to a DC charging voltage of a battery. The input terminal of the converter is composed of the bridge circuit having the plurality of bridge arms. The bridge circuit may include the plurality of switching elements. The controller C may control the converter and the resonant capacitor R connected to the bridge arm by controlling the switching element of the converter.

The controller C may control the switching elements of the converter based on the current detected from the load of the output terminal of the converter. The load current may be detected based on the current sensor I provided on the output terminal. The controller C switches the topology of the converter by controlling the activation or deactivation of the resonant capacitor C connected to the bridge arms. Here, the topology refers to a method of composing a circuit, and means a method of connecting elements constituting the circuit. Here, the topology may include a full-bridge (FB) type or half-bridge (HB) type bridge circuit. In addition, the topology may be a phase-shift full-bridge (PSFB) converter having a full-bridge (FB) type bridge circuit or an LLC resonant converter having a half-bridge type bridge circuit.

FIGS. 2A and 2B are views illustrating a PSFB converter and a half-bridge (HB) type LLC resonant converter according to the prior art. As shown in FIG. 2A, the PSFB converter is a device that converts power based on the principle of operation of a forward power transfer mode, a zero voltage switching (ZVS) mode, a freewheeling mode, a commutation mode, or a reverse power transfer mode. The PSFB converter has high efficiency because it is easy to apply the ZVS mode at high load and the output voltage/current ripple is small. However, in the PSFB converter, an inverter at an output terminal is additionally required, and the ZVS mode is difficult at low load, so the efficiency is low. This is because the gate is turned on before the voltage between the drain and source of a field-effect transistor (FET) like a MOSFET reaches the ZVS mode, that is, 0V. Accordingly, the efficiency of the PSFB is lowered due to switching losses at low load.

As shown in FIG. 2B, the LLC resonant converter is composed of an inverter at an input terminal, a resonant tank, and a rectifier at an output terminal. Unlike the PSFB converter, the LLC resonant converter does not require the inverter at the output terminal, and it is provided with a resonant capacitor and a resonant inductor inside the resonant tank connected to the bridge arm of the inverter at the input terminal. The LLC resonant converter is easily to apply the ZVS mode at low load. This is because the gate is turned on after the voltage between the drain and the source of a FET such as a MOSFET reaches ZVS mode, that is, 0V. Accordingly, the LLC resonant converter has no switching loss at low load and thus has high efficiency. However, in the LLC resonant converter, a ripple current increases at high load, so the ripple current loss power increases and the efficiency decreases. Therefore, the apparatus for controlling the converter according to an embodiment of the present invention detects the load state in order to derive the advantages of the PSFB converter and the LLC resonant converter, respectively, and thus converts the topology into an unpredictable form.

FIG. 3 is a view showing a converter according to an embodiment of the present invention. In the apparatus for controlling the converter according to an embodiment of the present invention, a plurality of switching elements include a first switch Q1 and a third switch Q3 connected in series to a first bridge arm BA1 of an input terminal, and a second switch Q2 and a fourth switch Q4 connected in series to a second bridge arm BA2 of the input terminal. The converter has the resonant capacitor RC that has one end connected to the first bridge arm BA1 between the first switch Q1 and the third switch Q3, and the other end connected to the second bridge arm BA2 between the second switch Q2 and the fourth switch Q4, and is connected between the first bridge arm BA1 and the second bridge arm BA2. The resonant capacitor RC may further include a control switch CS connected in parallel to the resonant capacitor RC. The control switch CS has one end connected to the second bridge arm BA2 between the second switch Q2 and the fourth switch Q4, and the other end connected to the first bridge arm BA1 between the first switch Q1 and the third switch Q3, and may turn on or off whether the resonant capacitor RC is activated according to the control of a Turn On-off controller.

As shown in FIG. 3, in the apparatus for controlling the converter according to an embodiment of the present invention, the converter includes a full-bridge type bridge circuit at the input terminal. The plurality of switching elements Q1-Q4 included in the bridge circuit of the input terminal includes the first switch Q1 and the third switch Q3 connected in series to the first bridge arm BA1 of the input terminal, and the second switch Q2 and the fourth switch Q4 connected in series to the second bridge arm BA2 of the input terminal. However, unlike the conventional PSFB converter shown in FIG. 2, the converter of FIG. 3 does not include the output inverter at the output terminal. In addition, a current sensor may be connected to the output terminal as shown in FIG. 3 in order to detect the output current of the output terminal.

In addition, as shown in FIG. 3, in the apparatus for controlling the converter according to an embodiment of the present invention, the bridge circuit of the converter includes the plurality of switching elements Q1-Q4 connected to the respective bridge arms. In the converter of FIG. 3, one end is connected to the first bridge arm BA1 between the first switch Q1 and the third switch Q3, and the other end is connected to the second bridge arm BA2 between the second switch Q2 and the fourth switch Q4. However, unlike the conventional LLC resonant converter shown in FIG. 2, in the bridge circuit of the converter, the resonant capacitor RC may be configured to be connected between different bridge arms. That is, the converter of FIG. 3 includes the resonant capacitor RC connected between the first bridge arm BA1 and the second bridge arm BA2.

In addition, as shown in FIG. 3, in the apparatus for controlling the converter, the resonant capacitor may include the control switch CS connected in parallel to the resonant capacitor RC in order to switch whether the resonant capacitor RC is used. In addition, the controller may control whether the resonant capacitor RC is activated by controlling the operation of the control switch based on the load current on the converter. Whether or not the resonant capacitor RC is used can be controlled by controlling to turn on or off the control switch based on the load current of the converter input to an operational amplifier (Op-Amp) shown in FIG. 3.

FIG. 4 is a view showing an example of the operation of the apparatus for controlling the converter according to an embodiment of the present invention shown in FIG. 3, and in the apparatus for controlling the converter according to the embodiment of the present invention, the controller may control to activate the resonant capacitor RC when the load current value of the converter detected by the current sensor provided on the load $R_o$ of the converter is within a predetermined low current region. The controller may control to deactivate the resonant capacitor RC when the control switch CS is controlled to be turned on, and control to activate the resonant capacitor RC when the control switch CS is controlled to be turned off. That is, by measuring the load current value and determining whether the load is high or low, the controller controls to activate the resonant capacitor RC and switches the topology of the converter.

FIG. 4 shows a state in which the control switch CS of the converter shown in FIG. 3 is turned off in the apparatus for controlling the converter according to an embodiment of the present invention. Since the load current value of the converter detected by the current sensor provided on the load $R_o$ of the converter is within the predetermined low current region, that is, it is detected in the low load state, the controller controls the control switch CS to be turned off. Here, the low current region may be greater than 0 and less than or equal to 5% of the maximum output that the load $R_o$ can withstand. The operational amplifier shown in FIG. 3 differentially calculates the load current value in the low-current region, and then transmits an off-switching signal to the control switch. Accordingly, the control switch CS shown in FIG. 4 is turned off, and the resonant capacitor RC is activated.

Meanwhile, as shown in FIG. 4, the fourth switch Q4 is turned off to perform the same operation in the low load state as the LLC resonant converter. In addition, in order to perform the same operation as the LLC resonant converter, the second switch Q2 is always on. Accordingly, the topology of the converter is implemented as the HB type LLC resonant converter according to the operations of the first switch Q1 and the third switch Q3. Accordingly, the LLC resonant converter in the low load state has increased efficiency because there is no switching loss in the ZVC mode of the FET of the third switch.

FIG. 5 is a view showing an example of the operation of the converter in the apparatus for controlling a converter according to the embodiment of the present invention shown in FIG. 3. In the apparatus for controlling a converter according to an embodiment of the present invention, the controller may control to deactivate the resonant capacitor RC when the current value on the load $R_o$ of the converter detected by the current sensor provided on the load of the converter is within a predetermined high current region. The controller may control to deactivate the resonant capacitor RC when the control switch CS is controlled to be turned on, and to activate the resonant capacitor RC when the control switch CS is controlled to be turned off. In other words, by measuring the current value on the load $R_o$ of the converter and determining whether it is a high load or a low load, the controller controls to deactivate the resonant capacitor RC to switch the topology of the converter.

In the apparatus for controlling a converter according to an embodiment of the present invention, FIG. 5 shows a state in which the control switch CS of the converter shown in FIG. 3 is turned on. The control switch CS is turned on by the controller because the load current value of the converter detected by the current sensor provided on the load $R_o$ of the converter is within a predetermined high current region, that is, it is detected as a high load state. Here, the high current region may be more than 5% of the maximum output current that the load $R_o$ can withstand. The operational amplifier shown in FIG. 3 differentially calculates the load current value of the high current region, and then transmits the on-switching signal to the control switch CS. Accordingly, the control switch CS shown in FIG. 4 is turned on, and the resonant capacitor is deactivated.

Meanwhile, as shown in FIG. 5, the fourth switch Q4 is turned on to perform the same operation as the PSFB converter in a low load state. In addition, the second switch Q2 is turned on to perform the same operation as the PSFB converter. Accordingly, the topology of the converter is implemented as a PSFB converter. Accordingly, the PSFB converter in the high load state has increased efficiency because there is no switching loss in the ZVC mode.

FIG. 6 is a flowchart of a method for controlling a converter according to another embodiment of the present invention. A method for controlling a converter according to an embodiment of the present invention includes detecting a load current of a converter including a bridge circuit (S100) and switching a topology of the converter by controlling whether a resonant capacitor connected between first and second bridge arms constituting the bridge circuit is activated (S300, S400) based on the detected load current of the converter (S200). Here, the topology of the converter may have a full-bridge type or a half-bridge type.

Here, the method for controlling a converter according to an embodiment of the present invention may be performed by a single or a plurality of controllers mounted on a vehicle. Alternatively, the method for controlling a converter according to the embodiment of the present invention may be performed by a single controller, that is, one integrated controller. In the following description, a controller may be a generic term for a plurality of controllers, or may be a single integrated controller that performs a function.

As shown in FIG. 6, in the method for controlling a converter according to an embodiment of the present invention, the load current of the converter including the bridge circuit is detected (S100). The load current of the converter can be detected by a current sensor. However, the method of detecting the load current value of the converter is not limited, and may be easily adopted and used by a person skilled in the art. In an embodiment of the present invention, if the load is a rechargeable battery, the load current value may be detected using an open circuit voltage (OCV). In another embodiment of the present invention, the battery management system (BMS) may detect the load current value by using a battery charging current and an amount of electricity (Ah: ampere hour) counter for a battery charging voltage during charging.

The BMS may detect a load current value by using a voltage charging current and amount of electricity (Ah: ampere hour) counter for a voltage that charges the battery while charging the battery.

As shown in FIG. 6, in the method for controlling a converter according to an embodiment of the present invention, it is determined whether the load current of the converter including the bridge circuit is less than a certain ratio of the maximum output current that the load can withstand (S200). It is apparent that the present invention is not limited to whether the load current of the converter is a high load, a low load, or a heavy load, and it may be easily adopted and used by a person skilled in the art. In an embodiment of the present invention, the determination may be made based on the maximum output voltage or the region of the maximum output current, and the corresponding region may be divided into three or more. Each region can be divided into the same output current interval or different output current intervals.

As shown in FIG. 6, in the step of switching the topology of the converter of the apparatus for controlling a converter according to an embodiment of the present invention, the resonant capacitor may be activated when the detected load current value of the converter is within a predetermined low current region and the topology of the converter may be switched to a half-bridge type (S300). Accordingly, the converter is controlled to operate as a half-bridge type LLC resonant converter.

In addition, in the step of switching the topology of the converter, when the detected load current value of the converter is within a predetermined high current region, the resonant capacitor is deactivated and the topology of the converter can be switched to a full-bridge type. (S400). Accordingly, the converter is controlled to operate as a full-bridge PSFB converter.

As described above, in the apparatus for controlling a converter and method thereof according to embodiments of the present invention, the topology of the converter is switched according to the current value of the load of the converter through activation or deactivation of the resonant converter, so that control precision is improved. In addition, according to an embodiment of the present invention, it is possible to control the converter to perform an operation in a wider operating range compared to an existing structure, thereby enhancing price competitiveness in terms of hardware. In addition, the structure for controlling activation or deactivation of the resonant converter can increase efficiency and shorten the charging time when it is used for charging.

So far, preferred embodiments of the present invention have been mainly described. Those of ordinary skill in the art to which the present invention pertains will understand that the present invention can be implemented in a modified form without departing from the essential characteristics of the present invention. Therefore, the disclosed embodiments are to be considered in an illustrative rather than a restrictive sense. The scope of the present invention is indicated in the claims rather than the foregoing description, and all differences within the scope equivalent thereto should be construed as being included in the present invention.

What is claimed is:

1. An apparatus comprising:
a converter comprising a plurality of switching elements configured as a bridge circuit connected to an input terminal and having a plurality of bridge arms, wherein a topology of the converter is configured to be switchable to a full-bridge type topology or a half-bridge type topology, and wherein a resonant capacitor is connected to a midpoint between respective ones of the bridge arms; and
a controller configured to switch the topology of the converter to the full-bridge type topology or the half-bridge type topology by controlling whether the resonant capacitor is activated based on a load current of the converter, wherein the controller is configured to control whether the resonant capacitor is activated according to whether a load current value of the converter is within a predetermined low current region or a predetermined high current region.

2. The apparatus according to claim 1, wherein the controller is configured to switch the topology of the converter by controlling to turn on-off the plurality of switching elements based on the load current value of the converter.

3. The apparatus according to claim 2, wherein the controller is configured to switch the topology of the converter by controlling to turn on-off the plurality of switching elements based on the load current value of the converter detected by a current sensor provided on a load of the converter.

4. The apparatus according to claim 3, wherein the controller is configured to control activation of the resonant capacitor in response to the load current value of the converter detected by the current sensor provided on the load of the converter being within the predetermined low current region.

5. The apparatus according to claim 3, wherein the controller is configured to control inactivation of the resonant capacitor in response to the load current value of the converter detected by the current sensor provided on the load of the converter being within the predetermined high current region.

6. The apparatus according to claim 1, wherein:
the plurality of switching elements comprises a first switch and a third switch connected in series to a first bridge arm of the input terminal and a second switch and a fourth switch connected in series to a second bridge arm of the input terminal;
the converter comprises the resonant capacitor having a first end connected to the first bridge arm between the first switch and the third switch and a second end connected to the second bridge arm between the second switch and the fourth switch; and
the resonant capacitor further comprises a control switch connected in parallel to the resonant capacitor.

7. The apparatus according to claim 6, wherein the controller is configured to control whether the resonant capacitor is activated by controlling an operation of the control switch based on the load current of the converter.

8. The apparatus according to claim 7, wherein the control switch comprises a first end connected to the second bridge arm between the second switch and the fourth switch and a second end connected to the first bridge arm between the first switch and the third switch, and wherein the control switch is configured to turn on or off whether the resonant capacitor is activated according to control by the controller.

9. The apparatus according to claim 7, wherein the controller is configured to control to deactivate the resonant capacitor in response to the control switch being controlled to be turned on, and control to activate the resonant capacitor in response to the control switch being controlled to be turned off.

10. A method for controlling a converter, the method comprising:
detecting a load current of the converter, which comprises a bridge circuit; and
switching a topology of the converter by controlling whether a resonant capacitor connected between first and second bridge arms constituting the bridge circuit, the switching being activated based on the detected load current of the converter, wherein the controlling comprises controlling whether the resonant capacitor is activated according to whether a detected load side current value of the converter is within a predetermined low current region or a predetermined high current region.

11. The method according to claim 10, wherein the topology of the converter comprises a full-bridge type or a half-bridge type.

12. The method according to claim 11, wherein converting the topology of the converter comprises switching to the half-bridge type in response to the detected load side current value of the converter being within the predetermined low current region.

13. The method according to claim 11, wherein converting the topology of the converter comprises switching to the full-bridge type in response to the detected load side current value of the converter being within the predetermined high current region.

14. The method according to claim 10, wherein switching the topology of the converter is performed by controlling to turn on-off a plurality of switches disposed at an input terminal of the converter.

15. The method according to claim 10, wherein switching the topology of the converter comprises controlling an operation of a control switch connected in parallel to the resonant capacitor based on the load current of the converter to control whether the resonant capacitor is activated.

16. A method of controlling a converter comprising a plurality of switching elements arranged as a bridge circuit connected to an input terminal, the bridge circuit comprising a plurality of bridge arms, the method comprising:
connecting a resonant capacitor to a midpoint between respective ones of the bridge arms; and
switching a topology of the converter to a full-bridge type or a half-bridge type by controlling whether the resonant capacitor is activated based on a load current of the converter, wherein the controlling comprises controlling whether the resonant capacitor is activated according to whether a load current value of the converter is within a predetermined low current region or a predetermined high current region.

17. The method according to claim 16, wherein switching the topology of the converter comprises controlling to turn on-off the plurality of switching elements based on the load current value of the converter.

18. The method according to claim 16, wherein:
the plurality of switching elements comprises a first switch and a third switch connected in series to a first bridge arm of the input terminal and a second switch and a fourth switch connected in series to a second bridge arm of the input terminal;
the converter comprises the resonant capacitor having a first end connected to the first bridge arm between the first switch and the third switch and a second end connected to the second bridge arm between the second switch and the fourth switch; and the resonant capacitor further comprises a control switch connected in parallel to the resonant capacitor.

19. The method according to claim 18, wherein controlling whether the resonant capacitor is activated comprises controlling an operation of the control switch based on the load current of the converter.

20. The method according to claim 18, further comprising:

deactivating the resonant capacitor in response to the control switch being controlled to be turned on; and activating the resonant capacitor in response to the control switch being controlled to be turned off.

* * * * *